United States Patent [19]

Graboyes et al.

[11] 4,341,008
[45] Jul. 27, 1982

[54] METHOD OF REGISTERING A STEEL RULE DIE AND COUNTERPLATE

[75] Inventors: Herman A. Graboyes, Mishawaka; Frank D. Helman, Elkhart, both of Ind.

[73] Assignee: Atlas Steel Rule Die, Inc., Elkhart, Ind.

[21] Appl. No.: 220,373

[22] Filed: Dec. 29, 1980

[51] Int. Cl.³ .............................................. B23Q 3/00
[52] U.S. Cl. ........................................ 29/467; 29/423; 29/464
[58] Field of Search ................ 29/423, 467, 469, 464, 29/468, 445, 465

[56] References Cited

U.S. PATENT DOCUMENTS

| 3,254,399 | 6/1966 | Zahuramec | 29/464 |
| 3,257,720 | 6/1966 | Siter | 29/464 |
| 3,276,854 | 10/1966 | Felher | 29/464 |
| 3,725,993 | 4/1973 | Siter | 29/464 |
| 4,276,690 | 7/1981 | Gustafson | 29/467 X |

Primary Examiner—Leon Gilden
Attorney, Agent, or Firm—Oltsch, Knoblock & Hall

[57] ABSTRACT

A method for registering and aligning a steel rule die and counterplate. The die and counterplate each have registration holes into which a semi-permanent pin is inserted to hold the die and counterplate in alignment during positioning within a reciprocating cutter.

2 Claims, 4 Drawing Figures

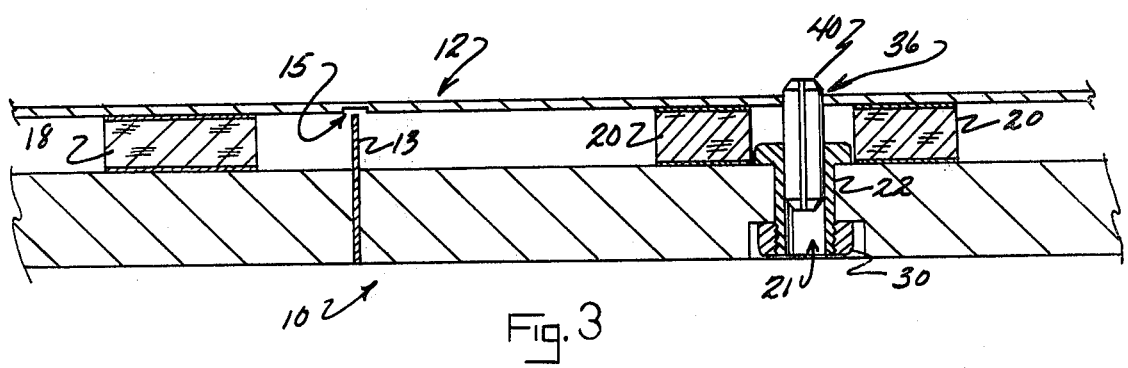
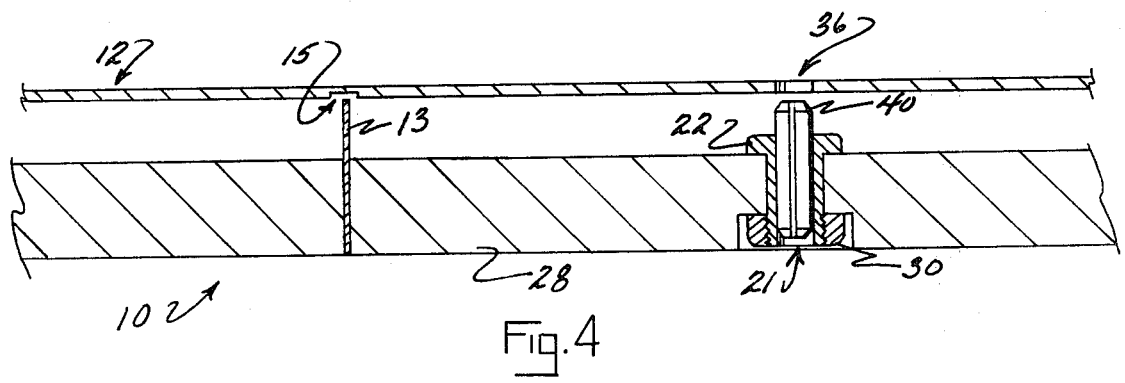

METHOD OF REGISTERING A STEEL RULE DIE AND COUNTERPLATE

SUMMARY OF THE INVENTION

This invention relates to a method for registering a steel rule die and counterplate with application to maintaining proper alignment of the die and counterplate during insertion into a reciprocating cutter.

When a steel rule die is to be utilized with a complementary counterplate there may be great difficulty in aligning the two during the insertion into the cutter. To alleviate the problem, removable support pads with adhesive faces are used to hold the two in alignment. However, this type of alignment means is prone to displacement by inadvertent contact. To correct this problem, holes were made in the counterplate and steel rule die to accept T-handle pins. The T-handle pins serve to immobilize the die and counterplate. In order to insert the die-counterplate combination into a module, however, the T-handle pins need to be removed. Therefore, the alignment of the plate and die would then, again, be susceptible to displacement during insertion in the cutter.

The present invention serves to alleviate the possibility of displacement even during insertion into a cutter. The prior methods of alignment are combined with the addition of semi-permanent friction pins substituted at an appropriate time for the T-handle pins.

Accordingly, it is an object of this invention to provide an improved registration system. For a reciprocating cutter utilizing a steel rule die and a counterplate.

Another object is to provide a semi-permanent pin registration system for a reciprocating cutter.

Still another object is to provide a registration system which prevents displacement of a counterplate relative to a die during insertion into the cutting module.

Other objects will become apparent upon a reading of the following description.

BRIEF DESCRIPTION OF THE DRAWINGS

FIG. 3 is a view similar to that in FIG. 2, but with a friction pin replacing the T-handle pin.

FIG. 4 is a view similar to that in FIG. 3, with the registration pin partially driven into the die.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use, to thereby enable others skilled in the art to best utilize the invention.

Figure 1:
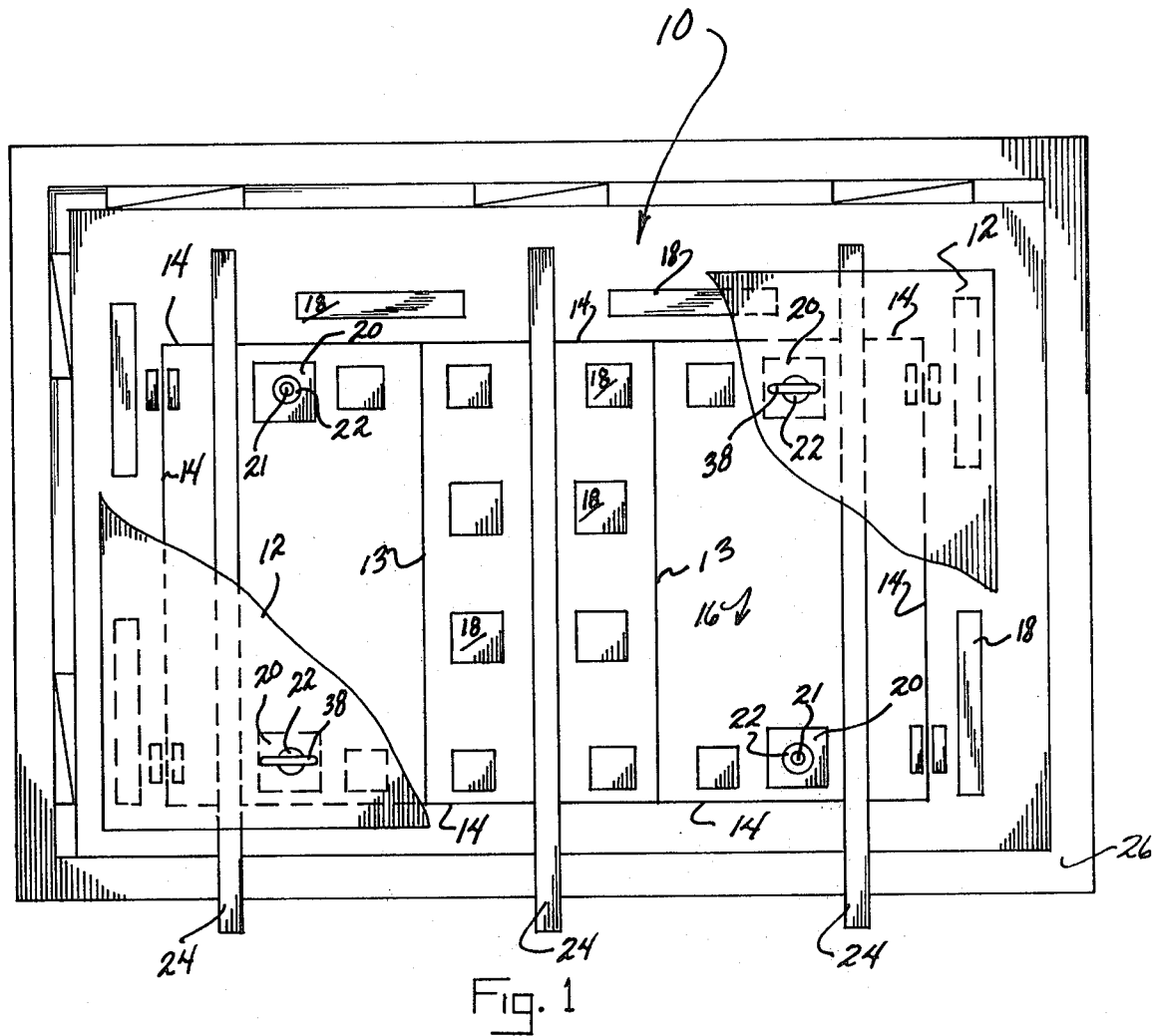
FIG. 1 is a top plan view of the steel rule die prepared for the alignment with the counterplate shown in a fragmentary section.
Figure 2:
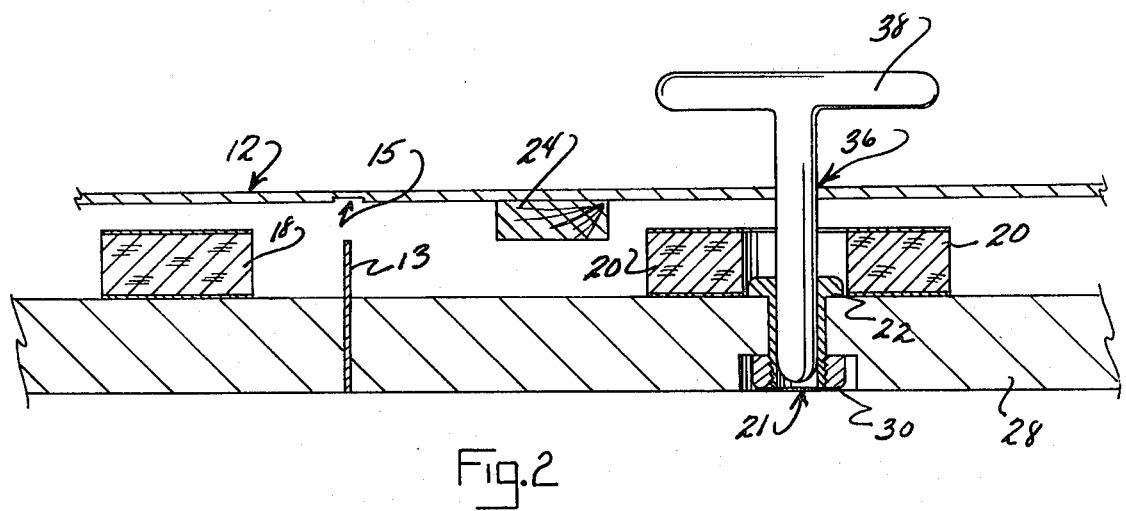
FIG. 2 is a fragmentary cross-sectional view of the steel rule die with a counterplate and T-handle pin in place.

Referring to FIG. 1, the layout of a steel rule die 10 is shown prepared for registration with a counterplate 12. Die 10 has knives 14 and rules 13 projecting from its upper surface 16. Removable support pads 18 of various shapes and sizes are located on die face 16. A plurality of registration bores 21 are formed in die 10. Each bore 21 is accurately defined by a bushing 22 secured to die body 28 by a nut 30. A support pad 20 extends about each bore 21. Slats 24 stretch across die 10 and rest above its upper face 16 upon knives 14. As shown in FIG. 1, die 10 is first fitted into a chase 26 for insertion into a cutter. A counterplate 12, seen in FIG. 2, has grooves 15 which are alignable with rules 13 of die 10. Registration holes 36 are formed in counterplate 12 and are located so as to be aligned with bores 21 when rules 13 and grooves 15 are properly aligned for cutting.

The method of this invention is used to insure proper alignment of rules 13 of die 10 with grooves 15 of counterplate 12 in a reciprocating cutting module. Face 16 of steel rule die is cleaned with a solvent such as acetone in preparation for pads 18 and 20. Pads 18, 20 have upper and lower adhesion contact surfaces for adherence to die 10 and counterplate 12.

After die 10 is secured into chase 26, slats 24 are laid across die face 16. Slats 24 are of a height greater than pads 18, 20. Counterplate 12 is then rested upon slats 24 with its holes 36 being aligned with bores 21 in die 10. A T-handle pin 38 is inserted through each hole 36 and into bushing 22 of the aligned bore 21. With all of T-handle pins 38 positioned, counterplate 12 is firmly held in place over die 10. Slats 24 are then removed from between counterplate 12 and die 10 and the counterplate is firmly pressed down toward the die onto the adhesion pads 18, 20.

One T-handle pin 38 is removed at a time and is replaced by a friction or locating pin 40 as seen in FIG. 3. Pin 40 is inserted into the bushing 22 until approximately 1/16 inch extends above counterplate 12. This procedure is then repeated for all pins 38.

The combination of die 10 and counterplate 12 is now placed between platens of the cutter and locked therein. The cutter can now be jogged into its impression position to firmly adhere or secure the die and counterplate to the cutter platens. The cutter is then backed off to separate counterplate 12 from die 10. Friction pins 40 are either driven into bushings 22 to remain there as seen in FIG. 4 or removed completely from the bushings. Pads 18, 20 are then removed and die 10 and counterplate 12 are cleaned.

It is to be understood that the invention is not to be limited to the preceding description, but may be modified within the scope of the appended claims.

What we claim is:

1. In a reciprocating cutter utilizing a steel rule die and cooperating counterplate, said die including a body, a plurality of rules protruding from said body, said counterplate having a plurality of grooves, said die and counterplate having a plurality of alignable openings formed therein, said counterplate grooves being aligned with said die rules when said die and counterplate openings are aligned, a handled pin insertable through each aligned opening in said die and counterplate whereby said counterplate groove will be maintained with alignment with said die rules, the method of registering said die and counterplate within said cutter comprising the steps of:

a. securing adhesive support pads upon said die about the rules thereof, b. supporting said counterplate above said die with said die and counterplate openings in alignment, c. inserting said handled pins into said aligned openings for securing said counterplate against transverse movement relative to said die, d. pressing said counterplate into binding contact with said support pads with said handled pins remaining inserted into said aligned openings, e. removing each handled pin from said aligned openings, f. inserting a locating pin into each aligned opening after removal of the handled pin therefrom to form a die and counterplate unit, g. placing said die and counterplate unit between reciprocable platens of said cutter and securing each die and counterplate to a platen, and h. separating said counterplate and die and removing said support pads.

2. The method of registration of claim 2 wherein the steps of removing said locating pins includes urging each pin into said die to clear said counterplate openings.

* * * * *